March 13, 1951  F. P. WEBER ET AL  2,545,218
DISCRIMINATING ACOUSTIC SIGNAL DETECTOR
Filed Sept. 16, 1947
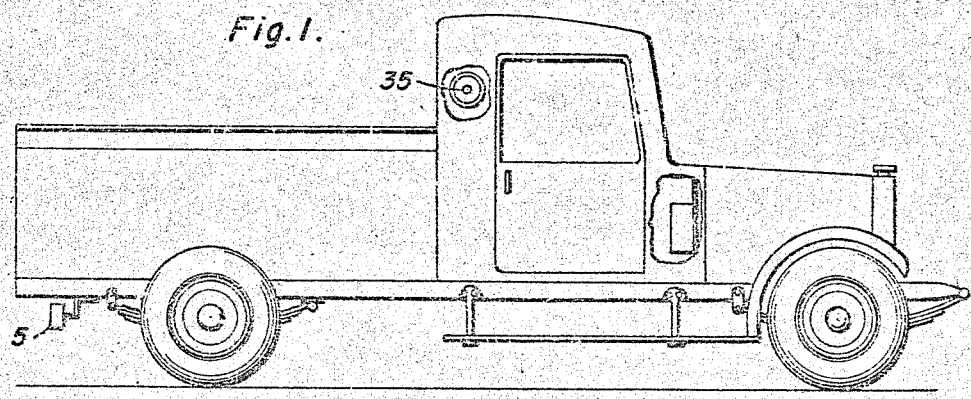
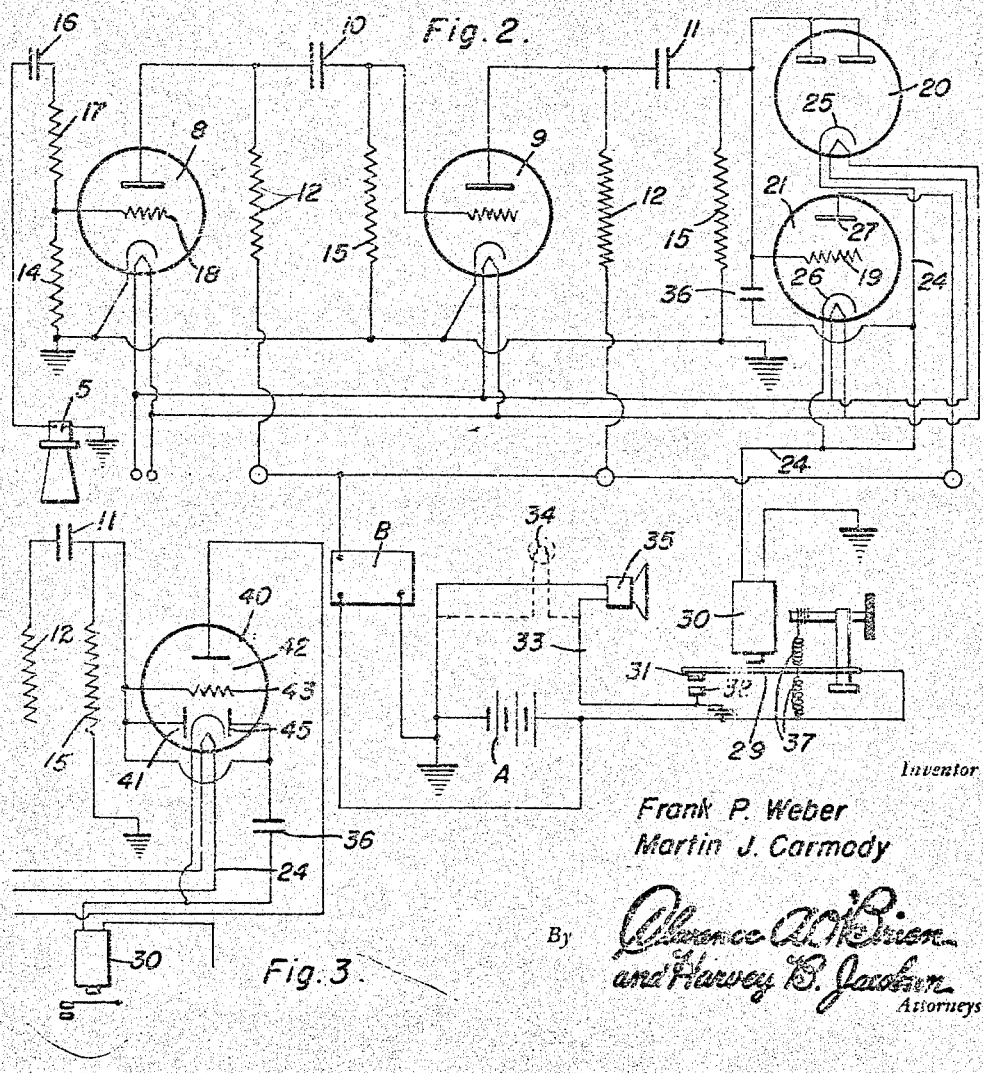
Inventor
Frank P. Weber
Martin J. Carmody

UNITED STATES PATENT OFFICE 2,545,218

DISCRIMINATING ACOUSTIC SIGNAL DETECTOR

Frank F. Weber, Hastings, Nebr., and Martin J. Carmody, Parkston, S. Dak.

Application September 16, 1947, Serial No. 774,252

2 Claims. (Cl. 177—352)

This invention relates to detectors for acoustic signals which are received within sound producing surroundings and it has for its main object to provide means for producing a local readily distinguishable unmistakable signal whenever a sound signal is received which on account of the sound producing surroundings might remain unnoticed or might escape attention.

It is a well known fact that within sound producing surroundings signals can only engage attention automatically if they are either of a special discriminating character distinguishing them clearly from other sounds, usually termed "noise," produced by or within the surroundings, or if their intensity is high above the noise produced. As nature and intensity of signals are repeatedly factors which cannot be controlled special means have to be used to make such signals audible so as to engage attention automatically, or to convert them into audible or visible signals, merely released when signals are delivered, but not produced by the noise or sounds generated in the surroundings.

It is therefore a primary object to provide means, adapted to be operated by a given type of acoustic signal and not requiring a special type of signal, which are adapted to be relayed or to be released by the incoming signals only, as soon as they are distinguishable from the noise surrounding them but which are not operated by the surrounding noise itself.

It is a further object of the invention to provide means which are capable of distinguishing signals, for instance signals given on a road by the users of the road, from surrounding noise, for instance the noise made by a moving truck, even if their intensity does not rise above that of the surrounding noise to such an extent as to engage automatically attention.

It is a further object of the invention to provide reception means for the signal sounds coming from the outside, such for instance, as the signals given by users of a road to other vehicles, which are separate from and not influenced by the sounds or noises at the place where the signals are to be delivered, for instance, by those noises which are audible within the cabin of a truck.

It is a further object of the invention to provide electronic means capable of distinguishing between background noises whatever their level and acoustic signals rising above them, even to a slight degree and to operate local signals merely when such an acoustic signal has been received.

It is a further object of the invention to provide electronic means consisting of a rectifier for signal currents and of an electronic current carrying tube, connected with the same, which control a permanently energized circuit, de-energized by the action of the increasing voltage of the rectified signal current in the electronic tube, a local special signal being operated by such de-energization.

Further and more specific objects will be apparent from the following detailed specification.

The invention is illustrated in the accompanying drawing showing one embodiment of the invention and a modification thereof. It is however to be understood that the arrangements shown and described are examples selected in order to explain the principle of the invention and the best mode of applying that principle. No survey of the various modifications based on the same principle is given and further modifications of the embodiments shown do therefore not necessarily involve a departure from the essence of the invention.

In the drawing:

Figure 1 is an elevational side view of a truck equipped with the device embodying the invention and showing one mode of application of the invention.

Figure 2 is a diagram of connections.

Figure 3 is a modification of this diagram, showing the use of a single combined tube in the last stage.

As above explained the purpose of the invention is the production of a distinctive signal reproducing an incoming signal when the latter is received under such circumstances that the direct detection of said signal is impossible or difficult. Such a direct detection can for instance be impossible or difficult in the case of an acoustic signal received in surroundings in which sounds usually termed "noise" are continuously produced from sources other than the source of signals. At a certain intensity level of the local sounds produced an incoming acoustic signal, even of greater intensity than said sounds, is no longer clearly distinguished. It is therefore necessary to provide a special arrangement in order to produce a distinctive signal. Such a signal may be a tuned or a specially selected signal or an optical signal which attracts automatically the attention.

Such a signal reproduction solves however merely the problem of distinguishing an otherwise clearly defined and clearly received incoming signal from other sounds which are locally produced. The problem is more difficult when reception of an acoustic signal has to take place under conditions in which the signal is received along with other sounds (noise) and is of an intensity only moderately above that of the surrounding noise at the reception point.

The invention deals essentially with the solution of this problem.

An example for cases of this type is the reception of an acoustic signal on a moving truck. The driver of the truck should be able to hear those acoustic signals which are given by other users of the road. In actual practice he is prevented from hearing such signals by the noise in the driver's cabin due to the engine, the gearing, the chain transmission and the movements and vibrations of the parts of the moving vehicle. The reception of the signal at a point outside the driver's cabin and the reproduction of the signal in the cabin will in itself not provide a remedy because at any point at which the pick up may be mounted the level of the "noise" sounds produced by the truck at this point is very high. The reproduction of the signal includes the reproduction of the noise sounds to which the noises in the driver's cabin are added. The result is a signal which is not sufficiently distinctive to engage attention.

The object of the invention is therefore to provide an arrangement which discriminates sufficiently between the noise produced permanently in the surroundings of the pick up and the acoustic signals received from other sources, such as for instance from other users of the road, to operate specially generated signals in the driver's cabin, exclusively produced by the incoming signals. These special signals need not necessarily be a reproduction of the signals received by the pick up, but may be generated in the cabin or on the vehicle. They should merely be of sufficient intensity and of such a character as to be readily detectable.

The arrangement shown in general in Figure 1 comprises a microphone 5 which is located in the rear of the truck or at some other point where the noise produced in its vicinity is as far as possible on an even level during operation. This microphone is connected with an amplifier, which is of the conventional type and is shown as a resistance coupled two stage triode amplifier, the triodes being indicated at 8 and 9, the coupling condensers at 10, 11, the resistances in the plate circuit at 12, 12 and the resistances in the grid circuits at 15, 15. It may be emphasized that other tubes or other couplings between the tubes may be used, as the amplifier shown in the drawing is not of special significance. The microphone 5 may be connected with the grid 18 of the first amplifier tube 8 by means of condenser 16 and resistance 17. A source for plate voltage is indicated at B and a source of current supply for heating the filaments at A. These sources of current may be special batteries or generators or they may derive their power from the sources of power of the car by any one of the means known for this purpose.

According to the invention the last stage consists of a combination of tubes or of a combined tube, one of them being a rectifier 20, the other a tube 21 provided with at least one control grid 19, connected with the output circuit of the amplifier. These tubes are jointed by a detector circuit coupled to the output circuit of the amplifier by means of condenser 11. The connection between the tubes 20 and 21 is made in such a way that the signal voltage is rectified, and that the rectified voltage is applied to the grid 19 and controls the passage of current through the tube 21. The plate 27 of the tube 21 is connected with the B battery as usual; the cathode circuit 24, including the cathodes 25 of the tube 20 and 26 of tube 21, contains a relay 30 having an armature 29 with relay contacts 31, 32 which are part of a signal circuit 33. The latter operates a signal formed either by a lamp 34 or by a horn 35.

If a horn 35 is used it is arranged close to the driver's ear and produces a special, easily detectable signal.

The armature 29 is finely adjustable by means of springs 37.

It will be noted that the relay in the example shown closes the circuit 33 when de-energized.

Instead of two tubes a single tube 40 of the combined type may be used in the terminal stage, as indicated in Figure 3. This tube includes two diodes 41 and a triode 42 with a control grid 43. The connections are essentially those above described, the anodes 45 of the diode being connected with each other, with the grid 43 of the triode and with the coupling condenser 11.

A condenser 36 may be connected across the diodes and between the grid and cathode of the triode as shown in Figures 2 and 3.

The operation will be clear from the above description. When the microphone and the amplifier are switched in, the microphone currents are amplified and are delivered over condenser 11 to the terminal stage consisting of tubes 20 and 21. The microphone currents are rectified in the diode and a certain negative voltage is produced across the diode which will also be impressed on grid 19, but as long as it does not exceed a certain limit does not affect the operation of the tube. Current therefore flows through tube 21 and energizes relay 30. The noise produced and even amplified however does not influence the relay. If a signal comes in which rises above the noise level the negative voltage across the diode increases and therefore the negative voltage of grid 19 reaches the point in which the current through relay 30 is cut off. Thereby relay 30 is de-energized and its armature snaps back and closes the signal circuit 33 the lamp 34 lights up or the horn 35 sounds.

When the signal again disappears the relay is again energized and cuts out the signal circuit 33.

It will thus be clear that the combination of a signal current rectifier with a triode operating near the cut off voltage with currents produced at the noise level by amplification of the sounds due to noise, and the further combination with a permanently energized relay, associated with said triode and operating signal circuit upon the cutting out of current through the diode permits to detect sounds which rise above the noise level and to use them for signal operation, so that special signals in the driver's cabin may be operated by them which will not fail to attract attention automatically.

The arrangement may be provided with various adjustments for the sound level which has to remain undetected. These adjustments are provided in first line by the suitable selection and adjustment of the electrical values in the diode-triode circuit. In addition only, a fine mechanical adjustment of relay armature 29 by means of springs 37 is shown which serves to adjust the limits and permits to adjust the amount of current which may still flow through the triode but which will nevertheless cause a falling back of the relay. The mechanical adjustment is the one which may be made accessible to the non-expert in electrical circuits for effecting a re-adjustment.

It will be clear to the expert that the arrangement shown may undergo certain obvious modifications of the circuit arrangement without any departure from the intended and above described operation.

Having described the invention, what is claimed as new is:

1. A warning signal detector for vehicles, discriminating between acoustic signals received in a microphonic device on the vehicle and transformed into oscillatory currents having an external source of origin and rising to momentary peak values and between sounds produced on the vehicle with the momentary peak values of the sound of external origin exceeding temporarily the sound level due to sounds produced on the vehicle, comprising a detector circuit, including an electronic grid controlled tube with at least one control grid adapted to cut off the current flow through the tube when biased by an excessive negative voltage, but normally biased for producing current flow through the tube, a grounded branch circuit including a resistance parallel to the electronic grid controlled tube, an energizing circuit for the said electronic tube, a signal controlling relay in said energizing circuit, normally energized by the current flow through the tube, a signal circuit containing a signal device closed upon de-energization of the relay and means for cutting off the current through the electronic relay and for operating the signal device in the signal circuit upon receipt of a peak signal rising above the sound level produced on the vehicle, said means including an electronic rectifier with electrodes, connected with the energizing circuit of the electronic tube and with the control grid respectively, said rectifier upon receipt of a signal of peak value rectified in the rectifier producing a biasing voltage for said grid, counteracting the normal grid bias of the controlled grid of the electronic tube and cutting off the current flow through the tube.

2. A warning signal detector for vehicles, discriminating between acoustic signals received in a microphonic device on the vehicle and transformed into oscillatory currents having an external source of origin and rising to momentary peak values and between sounds produced on the vehicle, the momentary peak values of the sound of external origin exceeding temporarily the sound level due to sounds produced on the vehicle, comprising means for amplifying the electric oscillations produced and an output circuit for the amplifying means, a detector circuit joined to said output circuit, said detector circuit including a branch with a resistance and a parallel branch, the latter including a grid controlled electronic tube and an electronic rectifier, the cathodes of the electronic tube and of the electronic rectifier being connected, an energizing circuit for the said grid controlled electronic tube and rectifier, including the said cathodes, a signal control relay in said energizing circuit, a signal circuit controlled by said relay, closed upon de-energization of the relay, a control grid for said electronic tube joined to the cathode circuit and connected with the branch arranged in parallel to the resistance containing branch and further connected with the plates of the electronic rectifier, said grid being normally biased for current passage through the tube, but being adapted to cut off the current flow upon the occurrence of a peak signal rectified in the rectifier and producing a voltage counteracting the normal grid bias and producing a predetermined negative excess voltage producing a cut off bias on said grid, the current interruption through said electronic tube producing the operation of the signal control relay and thereby operating the local warning signal upon occurrence of a signal of peak value surmounting the sound level of the sound produced on the vehicle.

FRANK P. WEBER.
MARTIN J. CARMODY.

REFERENCES CITED

The following references are of record in the file of this patent:

UNITED STATES PATENTS

| Number | Name | Date |
|---|---|---|
| 1,368,736 | Lavigne | Feb. 15, 1921 |

FOREIGN PATENTS

| Number | Country | Date |
|---|---|---|
| 430,459 | Great Britain | June 19, 1935 |
| 432,865 | Great Britain | Sept. 5, 1935 |
| 458,786 | Great Britain | Dec. 28, 1936 |
| 463,416 | Great Britain | Mar. 30, 1937 |